United States Patent
Huffman (10) Patent No.: US 12,345,244 B2
(45) Date of Patent: Jul. 1, 2025

(54) SYSTEMS AND METHODS FOR PROPULSION OF AN OBJECT IN A VACUUM

(71) Applicant: Orbital Arc Corporation, Lewes, DE (US)

(72) Inventor: Jonathan Huffman, Houston, TX (US)

(73) Assignee: Orbital Arc Corporation, DE (US)

( * ) Notice: Subject to any disclaimer, the term of this patent is extended or adjusted under 35 U.S.C. 154(b) by 7 days.

(21) Appl. No.: 18/585,369

(22) Filed: Feb. 23, 2024

(65) Prior Publication Data

US 2024/0309858 A1  Sep. 19, 2024

Related U.S. Application Data

(60) Provisional application No. 63/451,975, filed on Mar. 14, 2023.

(51) Int. Cl.
*F03H 1/00* (2006.01)
*B64G 1/40* (2006.01)

(52) U.S. Cl.
CPC ......... *F03H 1/0037* (2013.01); *F03H 1/0025* (2013.01); *B64G 1/413* (2023.08)

(58) Field of Classification Search
CPC .......... F03H 1/005; B64G 1/413; B64G 1/405
See application file for complete search history.

(56) References Cited

U.S. PATENT DOCUMENTS

| | | | |
|---|---|---|---|
| 3,279,176 A | 10/1966 | Boden | |
| 6,609,363 B1 | 8/2003 | Dressler et al. | |
| 7,174,703 B2 | 2/2007 | Hartley | |
| 9,194,379 B1 * | 11/2015 | Biblarz | F03H 1/00 |
| 2003/0136918 A1 | 8/2003 | Hartley | |
| 2011/0005191 A1 | 1/2011 | Ready et al. | |
| 2015/0155127 A1 | 6/2015 | Fink et al. | |
| 2024/0392735 A1 * | 11/2024 | Gamero-Castaño | B64G 1/413 |

FOREIGN PATENT DOCUMENTS

| | | |
|---|---|---|
| WO | WO2008103733 | 8/2008 |
| WO | WO2021225620 | 11/2021 |

OTHER PUBLICATIONS

Velasquez-Garcia "CNT-based gas ionizers with integrated MEMS gate for portable mass spectrometry applications" (Year: 2009).*
Hicks "A Carbon Nanotube Pillar Array Ionizer for Miniature Ion Thruster Applications" (Year: 2008).*
Johan Sjodahl, "Miniaturized Techniques for Protein Analysis", PhD Thesis, Royal Institute of Technology, Department of Chemistry, Division of Analytical Chemistry, Stockholm, Sweden, 2004, pp. 1-81. (Year: 2004).*
Bet-Max Electrospray Thruster System, Busek Space Propulsion and Systems, Version 1.0, Aug. 2021, pp. 1-3. (Year: 2021).*

* cited by examiner

*Primary Examiner* — Lorne E Meade
(74) *Attorney, Agent, or Firm* — Pierson IP, PLLC (57) ABSTRACT

A propulsion device for vehicles, such as a spacecraft operating within a vacuum configured to ionize a fuel gas. Specifically, a soft ionization system pulls electrons from passing gas molecules directly into conductors and introduces ionized gas molecules into a static accelerating field. The ionized gas is utilized at a point of creation such that a chamber, housing, or channel to contain the ionized gas is not required.

7 Claims, 8 Drawing Sheets

SYSTEMS AND METHODS FOR PROPULSION OF AN OBJECT IN A VACUUM

TECHNICAL FIELD

This disclosure relates generally to systems and methods for a propulsion of a space vehicle. Specifically, this disclosure relates to gas passed through an ionizer that ionizes the gas, wherein the ionized gas is utilized at a point of creation such that a chamber, housing, or channel to contain the ionized gas is not required.

BACKGROUND

Ion thrusters are forms of electric propulsion used for spacecraft by propulsion. Ion thrusters create thrust accelerating ions using electricity. Specifically, electrons are temporarily separated from positively charged nuclei, the nuclei are accelerated using an electric field to provide thrust, and the electrons are reinjected into the exhaust stream where they recombine with the nuclei and neutralize their charges.

Electric propulsion has the advantage of very high specific impulse (ISP), which is the measure of fuel efficiency for spacecraft propulsion. However, the tradeoff is very low fuel throughput and very high energy consumption resulting in a very low thrust.

Conventional ion thrusters rely on hard ionization methods, where high-energy electrons or photons collide with fuel molecules, and the impact releases more high-energy electrons, which cause further collisions in a chain reaction. A resulting plasma is formed of these high-energy particles, which impact the interior and containing components of the thruster, causing degradation of the materials over time. The plasma requires constant power input simply to be sustained, constant power for plasma containment systems to protect engine components and channel ions to their point of use, and constant power to the accelerating electrodes to sustain their voltage and fields, which require high energy use. Increasing fuel throughput or accelerating voltage increases all of these power demands, and ultimately leads to plasma containment failure, melting the thruster. As a result, conventional ion engines have a very low thrust, while consuming excessive amounts of energy.

Accordingly, needs exist for improved ion engines that utilize soft ionization to create ions at lower energy. This allows operation with no plasma containment, wherein the ions are immediately used for thrust, while thrust is provided by a retained electrostatic charge. These improvements require less power, and increase capability for fuel throughput and higher voltage, resulting in increases to both thrust and fuel efficiency.

SUMMARY

Embodiments may be directed towards a propulsion device for vehicles, such as a spacecraft operating within a vacuum that is configured to ionize a fuel gas. Specifically, in embodiments, a soft ionization system pulls electrons from passing gas molecules directly into conductors, and introduces ionized gas molecules into a static accelerating field. In embodiments, the pulled electrons are removed from the electrode following a shielded path utilizing a specifically designed conduit, where the electrons are shielded from the electrostatic static field of the ion accelerator. Other embodiments may not utilize a shielded conduit to remove the electrons from the electrode. The electrons can then be emitted into the space aft of the ionizer, where the electrons will neutralize the ion stream.

In embodiments, the soft ionization is achieved by using a specifically designed ionizer chip, which uses small pores through an insulator to constrain the fuel gas and force the fuel gas to pass near tips of coaxially aligned carbon nanotubes raised to a positive electric potential. By use of the very small gap sizes and the field enhancement factors achievable in very high aspect ratio conductors like carbon nanotubes, fields over 5 GV/m can be achieved, sufficient to ionize nearly 100% of the molecules within the fuel gas that pass through the ionizer.

By utilizing the ions at a point of creation, higher thrust can be obtained with higher fuel efficiency, while having slower thruster degradation. Furthermore, the magnitude of these improvements may cause delta-v to cease being a limiting constraint in spacecraft design, construction, and mission planning, with spacecraft at very reasonable fuel mass fractions able to carry much more delta-v than they require for any mission within our solar system.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present invention are described concerning the following figures, wherein reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common but well-understood elements that are useful or necessary in a commercially feasible embodiment are often not depicted to facilitate a less obstructed view of these various embodiments.

DETAILED DESCRIPTION

The embodiments and the various features and advantageous details thereof are explained more fully concerning the nonlimiting embodiments that are illustrated in the accompanying drawings and detailed in the following description. Descriptions of well-known starting materials, processing techniques, components, and equipment are omitted so as not to unnecessarily obscure the invention in detail.

It should be understood, however, that the detailed description and the specific examples, while indicating preferred embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before discussing specific embodiments disclosed herein, a general discussion may prove helpful. Embodiments are directed towards a propulsion device for spaceflight applications. Specifically, the propulsion device may be an ion thruster that uses a soft ionization approach to ionize fuel gas at the point of ion acceleration, minimizing heat and degradation of engine components. This may allow for higher energy operation, more fuel throughput, longer lifespan, and higher thrust than conventional systems.

Figure 1:
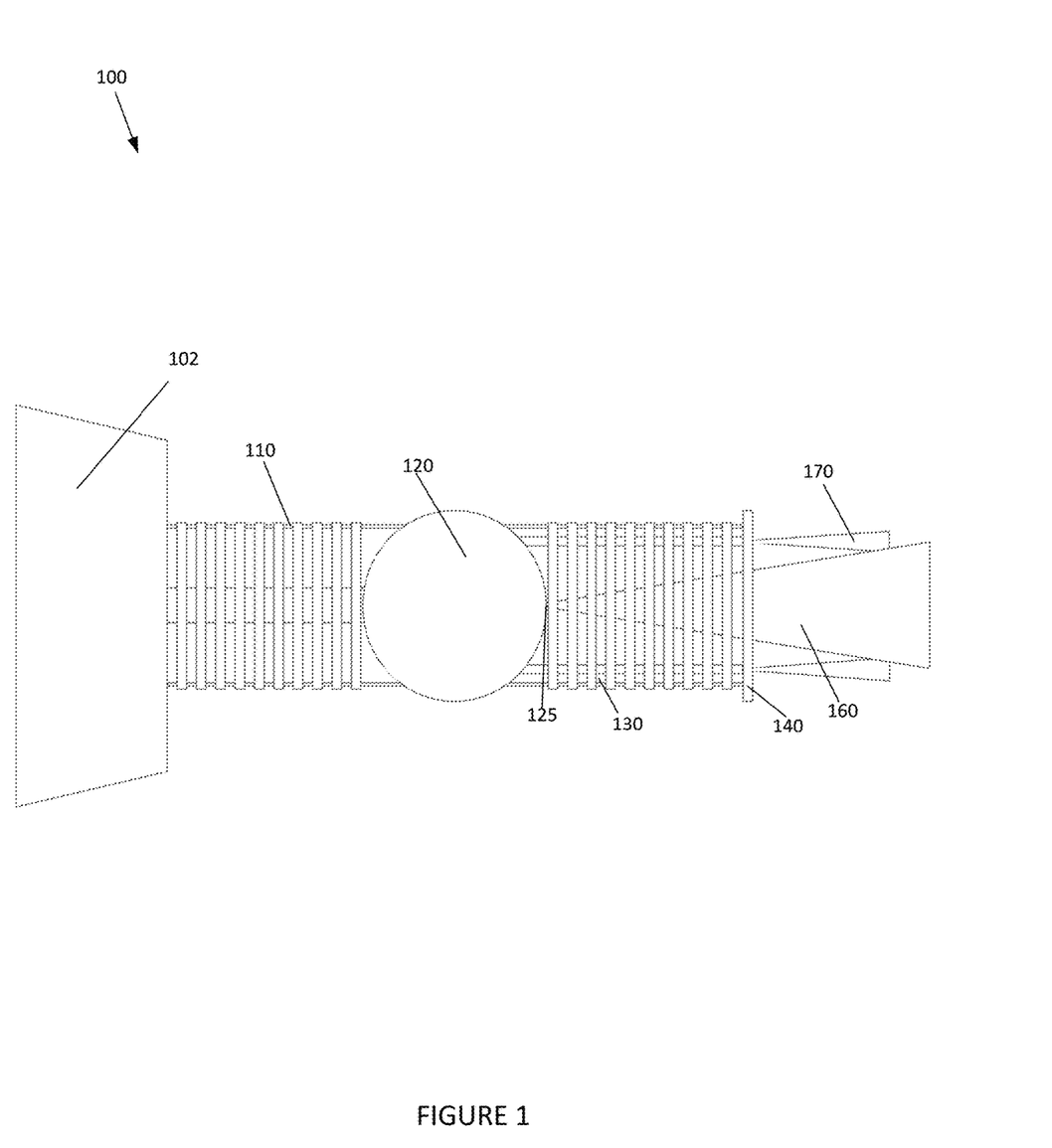
FIG. 1 depicts an ion thruster, according to an embodiment.

FIG. 1 depicts an ion thruster 100, according to an embodiment. Ion thruster 100 may not have a containment system, and may not use high energy photon or particle bombardment to conduct ionization. Instead, ions are made at the point of use by a soft ionization system that pulls electrons from passing gas molecules to create gas ions at energy levels too low to cause impact degradation of the surrounding engine components. Then, the ionizer is configured to immediately introduce the ionized gas molecules into a static acceleration field. The removed electrons are conducted to a neutralizer, which reinjects them to the ion exhaust stream to return it to neutral electric potential.

Ion thruster 100 may include a vehicle 102, intake conduit 110, electrode 120, ionizer 125, neutralizer conduit 130, neutralizer 140, and equipotential rings 150, wherein the ion thruster 100 is configured to emit a positive ion thrust plume 160 and a neutralizing electron plume 170.

Vehicle 102 may be a spacecraft or any other device designed for travel or operation in space beyond the Earth's atmosphere or in orbit around Earth or other celestial bodies. In other embodiments, vehicle 102 may be any object that is desired to move within a vacuum. Vehicle 102 may be configured to supply power and fuel to ion thruster 100. For example, vehicle 102 may be configured to supply electricity and a fuel gas, such as nitrogen, argon, xenon, oxygen, sulfur hexafluoride, $CO_2$, etc., to intake conduit 110.

Intake conduit 110 may be configured to supply a fluid and/or gas to electrode 120. Intake conduit 110 may be a central conduit that is configured to transport the supplied power and fuel from vehicle 102 to an ionizer 125 in high voltage accelerating electrode 120. Intake conduit 110 may also be configured to remove the electrons that are stripped off the fuel gas by ionizer 125.

Electrode 120 may be a conductive flat disc, a hemisphere, or another shape or format. High voltage electrode 120 may be configured to accumulate an electric charge, creating very high electric potentials, which can produce high voltage DC at low current levels. In specific embodiments, the charge of electrode 120 may scale with the size of electrode 120, wherein larger diameters accumulate greater charges and may utilize a greater number of equipotential rings, achieving voltages that may range from a few volts to tens of megavolts depending on the scale. It may be desirable for the charge on the shell of electrode 120 to be at least two times larger than the space charge developed by the ions between the electrode and the location where the ions are neutralized, such as the space aft of the neutralizer 140. This may ensure efficient propulsion of vehicle 102 in a forward direction while maintaining an electrostatic charge within electrode 120 and avoiding ion exhaust beam dispersion that may cause the exhaust ions to come in contact with the equipotential rings 150. In embodiments, a larger sized electrode 120 may allow for more charge to accumulate on the shell of electrode 120, which allows for a higher throughput of gas, while a smaller electrode minimizes thruster power requirements; both approaches may be valuable depending on the specific application.

Ionizer 125 may be positioned within electrode 120, and may be separated by electrical insulation up to a few millimeters thick from the inner circumference the aperture by which ionizer 125 penetrates through electrode 120, with the necessary thickness of insulation dependent upon the charge of the electrode 120. Ionizer 125 may be positioned as close as possible to the aft surface of electrode 120. Ionizer 125 may be configured to ionize gas molecules that pass-through ionizer 125, allowing each molecule to become an ion. Ionizer 125 may be configured to create the ions at a location directly adjacent to the aft surface of electrode 120, wherein the ions are accelerated for thrust at a point of creation. By using the ions directly at a point of creation, a plasma containment or management system within the ion engine is not necessary. Specifically, the ions created by ionizer 125 may be pushed into the very high voltage unidirectional field of electrode 120 via supplied fuel gas pressure, allowing the ions to automatically move away from ionizer 125 by electric repulsion at a speed determined by the electrode voltage. While the ions are utilized to create ion thrust plume 160, the stripped electrons from the atoms may be passed through neutralizer conduit 130 to the neutralizer 140.

In all embodiments, neutralizer 140 may be configured to produce a neutralizing electron plume 170 to neutralize the space charge behind electrode 120 created by the ion thrust plume 160. In some embodiments, neutralizer conduit 130 may be an exit passageway through which negative current, from the electrons stripped from ions by ionizer 125 and from the charging circuit 310, is passed from the charging circuit 310 and ionizer 125 to neutralizer 140. In other embodiments, neutralizer conduit 130 may be absent, and the neutralizer 140 may be positioned so that it uses the electrode 120 as a gate electrode to drive the electron plume 170 into space, where the electrons can combine with the ion thrust plume 160. In still other embodiments, the neutralizer 140 may be positioned axially within the center of a surrounding ring-shaped ionizer 125, and may emit electron plume 170 into the ion thrust plume 160 directly. The position and format of neutralizer 140 may be varied to optimize for the specific operating parameters of the ion thruster. For example, an axially positioned central neutralizer 140 will neutralize the ion thrust plume 160 nearer to the electrode 120, which allows higher ion current flows, but achieves lower ion exhaust velocities, while positioning neutralizer 140 to use electrode 120 as a gate electrode will increase the flight distance of ion thrust plume 160 prior to neutralization, which will increase exhaust velocity, at the expense of reducing the ion current flow capacity due to development of a larger space charge. By such adaptations, which are included by way of illustration and not limitation, any given embodiment of the invention can be tailored to achieve an optimal combination of ion throughput and fuel efficiency for the specific use case for which it is constructed.

In embodiments, every time an atom is ionized by ionizer 125, an electron is pulled off the atom, and the electron is conducted toward the neutralizer 140. That negative charge counterbalances one of the positive charges on the surface of electrode 120. Although the systems within the spacecraft are isolated from the systems on electrode 120, the field from these electrons partially neutralizes the effect of the positive charge of electrode 120. As a result, it is desirable to remove the electrons from within the spacecraft, wherein neutralizer 140 is configured to remove the electrons that are stripped off the fuel gas by ionizer 125 by emitting them into the ion thrust plume 160, so that the positive field of electrode 120 remains effective in accelerating ions by repulsion.

Neutralizer 140 may be configured to accelerate electrons into the space aft of the ionizer 125 via neutralizing electron plume 160. More specifically, the neutralizer 140 may be configured to neutralize the ion thrust plume 160 via neutralizing electron plumes 170, which eject negative charges pulled from the electrode 120 and from the ionizer 125 into space. This maintains the charge on electrode 120, and prevents space charge build up aft of ion thruster 100. In embodiments, neutralizing electron plumes 170 may be offset from a central axis of ion thruster 100, while positive ion thrust plume 160 may be aligned with the central axis of ion thruster 100. In other embodiments, neutralizer 140 may form a complete ring around the central axis of ion thruster 100, and the neutralizing electron plumes 170 may form a complete circle around the ion thrust plume 160. In still other embodiments, neutralizer 140 may be aligned with the central axis of ion thruster 100, and ionizer 125 may form a circle around neutralizer 140. Further configurations may also be represented in other embodiments.

In embodiments, equipotential rings 150 may be configured to be a voltage divider circuit to smooth the voltage gradient between electrode 120 and neutralizer 140, which operates with a net negative charge. In embodiments, equipotential rings 150 may be configured to create an approximately linear field potential gradient within the equipotential rings 150, allowing higher total fields with less risk of arcing or breakdown between components. Equipotential rings 150 may include a plurality of conductive rings separated by insulative rings, with each ring connected to an adjacent ring through high-voltage resistors. In embodiments, the second to last ring may be connected to ground potential. The last ring may be separately powered, and the last ring may include neutralizer 140. In embodiments, the last ring may be the ring that is furthest away from electrode 120. In other embodiments, equipotential rings 150 may be omitted, such as when the charge on the electrode 120 is sufficiently low that arcing and breakdown may be prevented with traditional single-layer electrical insulation.

Figure 2:
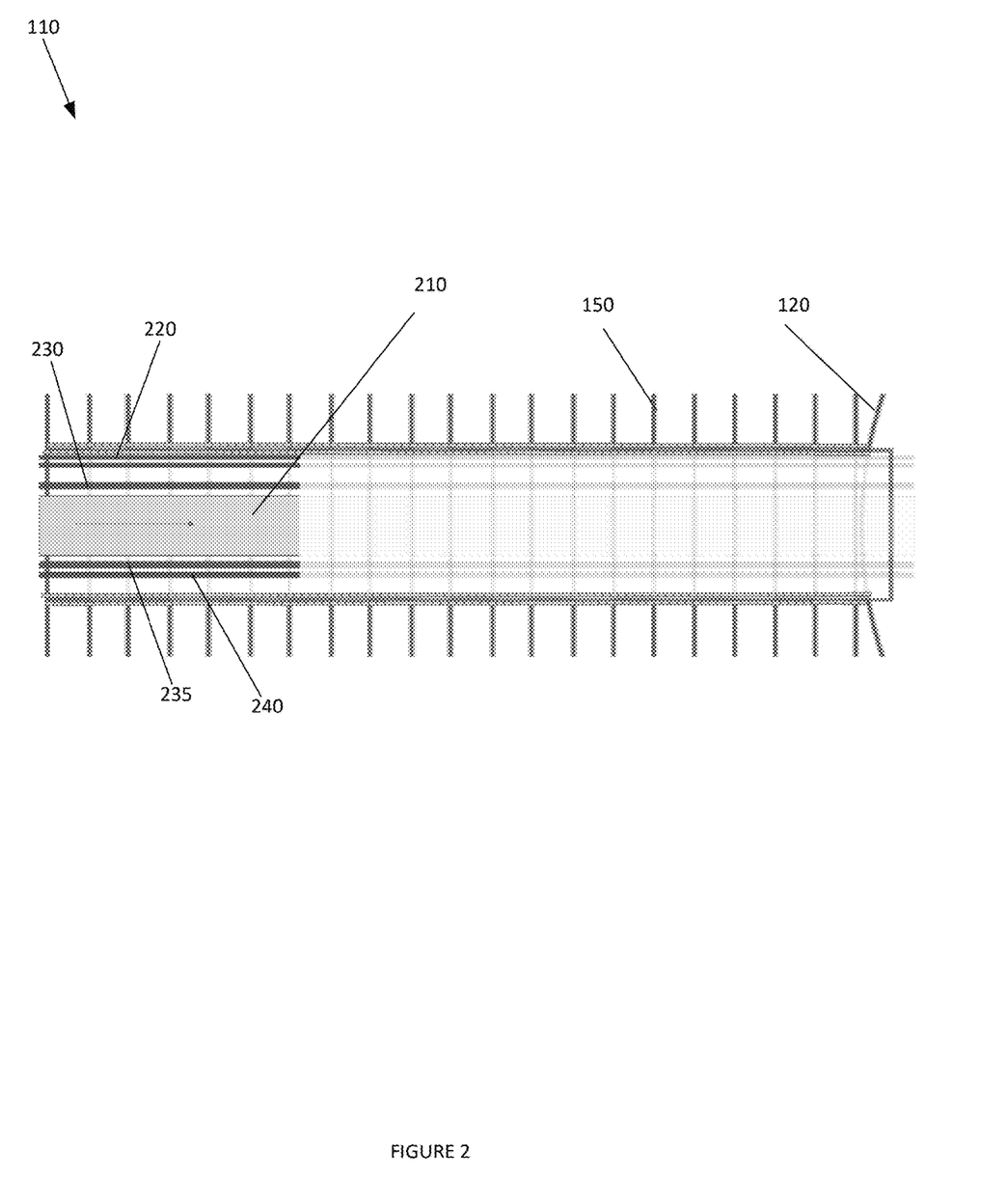
FIG. 2 depicts a detailed view of an intake conduit, according to an embodiment.

FIG. 2 depicts a detailed view of intake conduit 110, according to an embodiment. Intake conduit 110 may be a primary passageway through which power and/or fuel is fed to electrode 120, ionizer 125, and neutralizer 140. Intake conduit 110 may include a fuel tube 210, first power feed 220, second power feed 230, third power feed 235, ground return 240.

Fuel tube 210 may be a cylindrical tube extending from vehicle 102 into electrode 120. The cylindrical tube may be configured to allow a gas, such as sulfur hexafluoride, Argon or Ne, and/or liquid to travel through the tube under pressure. In embodiments, fuel tube 210 may vary in diameter based on the desired fuel flow rate. In embodiments, a total length of intake conduit 110 may be determined by the maximum voltage attained by electrode 120 and the spacing of the rings of the equipotential ring system 150, and the dielectric strength of the insulators between the rings. For example, if, in an embodiment, the dielectric strength of the insulators is 50 kV, then for each 50 kv of voltage on electrode 120, it may be desirable to add additional grading ring to equipotential ring system 150.

First power feed 220 may be a power feed from vehicle 102 to electrode 120. First power feed 220 may be configured to supply electricity to electrode 120 to power electrode 120. Second power feed 230 may be a power feed from vehicle 102 to neutralizer 140. Second power feed 230 may be configured to supply electricity to neutralizer 140 to power neutralizer 140. Third power feed 235 may be a power feed from vehicle 102 to ionizer 125.

Equipotential rings 150 may be configured to be positioned around intake conduit 110. Equipotential rings 150 may be a voltage divider that is configured to evenly distribute the electric potential from electrode 120. In embodiments, equipotential rings 150 may be formed of hollow metal tubes, such as aluminum circular tubes. The axial outer diameter of the equipotential ring 150 may be smaller than, larger than, or the same as the diameter of electrode 120. In embodiments, each of the equipotential rings 150 may be spaced equidistant from each adjacent ring. Continuing the prior example, equipotential rings 150 may be spaced five, ten, fifteen, and so on, millimeters apart. Each space between equipotential rings 150 may be filled by a high voltage insulator of the same axial inner diameter and outer diameter as the adjacent equipotential rings. This insulator may have dielectric strength at least equal to the voltage of the electrode 120 divided by the number of equipotential rings in the equipotential ring system 150. The dielectric strength of the insulators may exceed, but may not be less than the voltage of the electrode 120 divided by the number of equipotential rings 150. For example, in an embodiment wherein the electrode 120 carries a voltage of 200 kV, and there are ten rings in the equipotential ring system 150, then each insulator must have a dielectric strength of at least 20 kV, but any dielectric strength greater than 20 kV will also suffice.

In embodiments, each of the equipotential rings 150 may be bisected at a single point, so that a gap in the ring is created that is much smaller than the ring circumference, and a similar high voltage insulator may be inserted in the gap between the two ends of each of the equipotential rings 150. The number of the equipotential rings 150 may be selected based on the needs of the specific design and the available high voltage insulators. For example, in a specific embodiment, where electrode 120 has a potential of one MV, and insulators with dielectric strength of at least 50 kV are used, twenty equipotential rings 150 may be used between the electrode 120 and vehicle 102, and twenty more equipotential rings 150 may be positioned between electrode 120 and neutralizer 140. In other embodiments, where the electrode 120 has a voltage lower than the dielectric strength of a single layer of available insulator, the equipotential rings 150 may be omitted entirely, and simple electrical insulation may be used instead.

Figure 3:
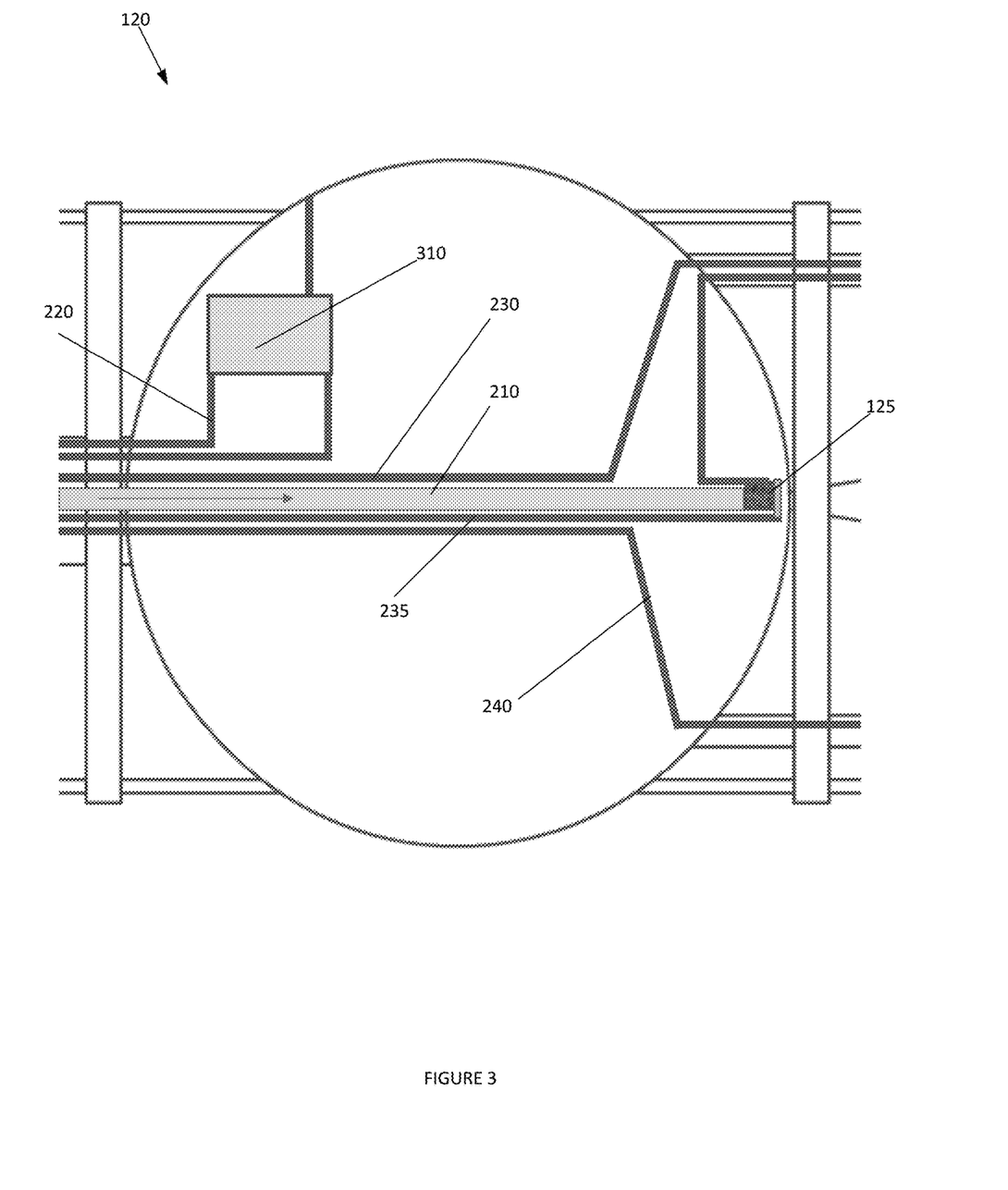
FIG. 3 depicts a detailed view of an electrode, according to an embodiment.

FIG. 3 depicts a detailed view of electrode 120, according to an embodiment. As depicted in FIG. 3 electrode 120 may include fuel tube 210, first power feed 220 and third power feed 235. Furthermore, electrode 120 may include an electrode charging circuit 310 and ionizer 125.

Electrode charging circuit 310 may be configured to control the charge of electrode 120 based on the charge loss rate of electrode 120. Electrode charging circuit 310 may also be configured to remove negative charges from electrode 120, which allows electrode 120 to accumulate a positive charge. In embodiments, electrode charging circuit 310 may be configured to automatically cycle in a manner that pulls negative charges from electrode 120 and releases them to neutralizer 140 where the negative charges are emitted into space or a vacuum. By removing the negative charges out of electrode 120, electrode charging circuit 310 may allow an accelerating electrode 120 to accumulate a net positive charge.

Ionizer 125 may be positioned on a distal end of fuel tube 210, and proximate to an outer surface of electrode 120. Ionizer 125 may be configured to ionize gas received from fuel tube 210, wherein the resulting ions are immediately introduced into the accelerating field area proximate to electrode 120. The accelerating field area may accelerate the ions by electric repulsion, providing thrust. Furthermore, ionizer may collect electrons removed from the atoms, and feed the electrons through neutralizer conduits 130 to neutralizer 140.

Figure 4:
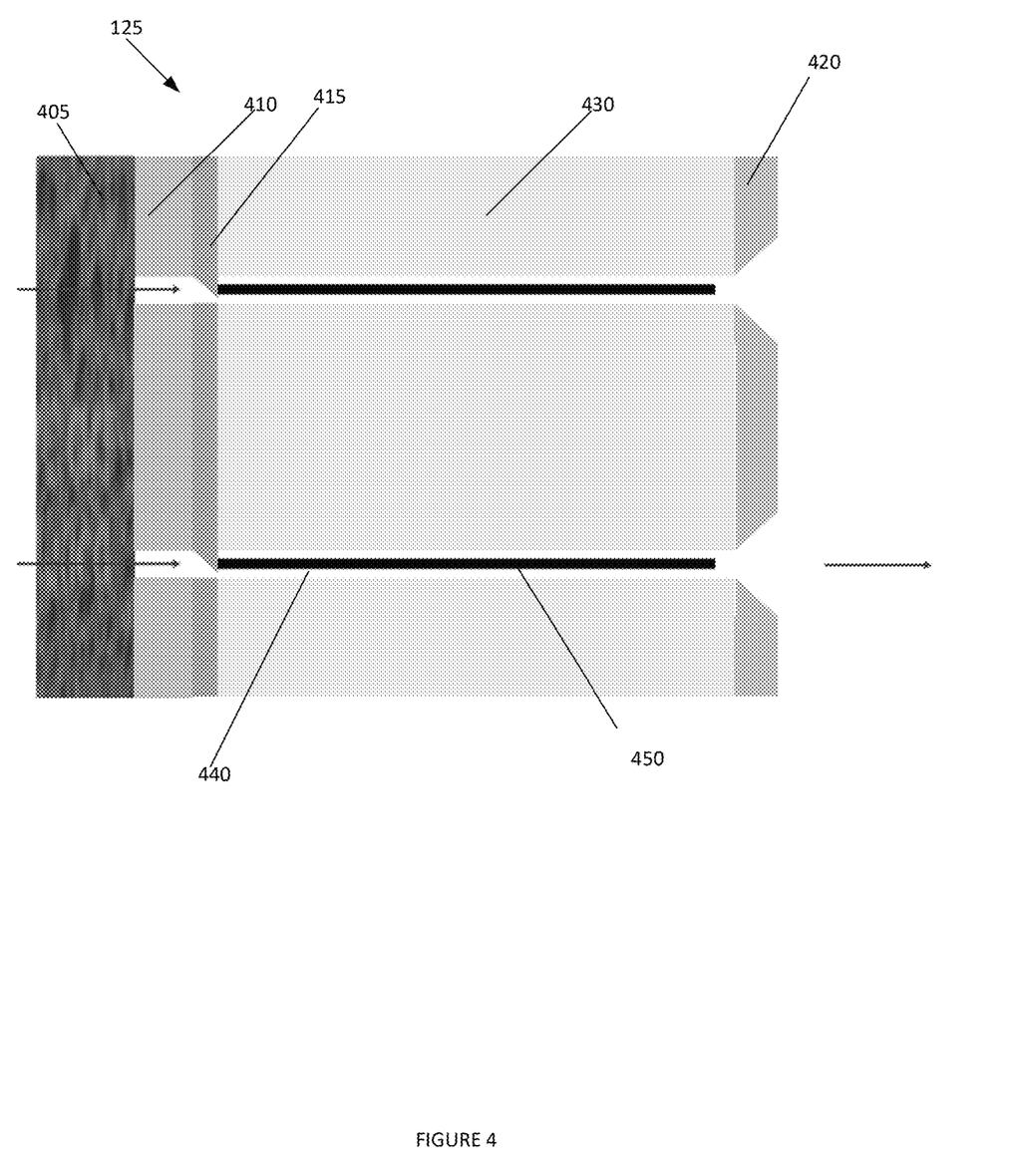
FIG. 4 depicts a detailed view of an ionizer, according to an embodiment.

FIG. 4 depicts a detailed view of ionizer 125, according to an embodiment. As depicted in FIG. 4 ionizer 125 may include a porous conductive substrate 405, bottom conductive layer 410, growth substrate 415, gate electrode 420, insulative layer 430, and nanotubes 450. Specific embodiments may not include every layer. For example, embodiments may not include the bottom conductive layer 410.

Ionizer 125 may be configured to receive fuel from fuel tube 210, push gas through pores 440, ionize the molecules within the fuel, and communicate the electron current from the ionized molecules to neutralizing conduits 130. In embodiments, ionizer 125 may be electrically separated from electrode 120.

Porous conductive substrate 405 may be porous graphite, an open cell copper foam, or other porous electrically conductive medium that is configured to receive and transmit fuel gas from fuel tube 210 into the pores 440. Neutral gas molecules pass down the pores 440 to the tips of the nanotubes 450, and pass into the gap between the nanotubes 450 and the gate electrode 420, where they are ionized by an electric field within the gap. The electrons collect on the nanotubes 450, which conduct electrons away from the received gas back to the porous conductive substrate 405, and then into the neutralizer conduits. For example, porous conductive substrate 405 may allow sulfur hexafluoride, Argon, $N_2$, or other gas to flow through pores 440 to the tips of nanotubes 450. In embodiments, nanotubes may positively biased high aspect ratio conductors with tips that generate a field enhancement effect. More specifically, a spacecraft may be configured to control an amount of ion current produced by ionizing a fuel gas by controlling the cross-sectional area of ionizer 125, and thereby controlling the number of pores that may transmit gas, or by controlling the gas flow to the porous conductive substrate 405 to control the number of gas molecules reaching the pores 440. Furthermore, porous conductive substrate 405 may be coupled to neutralizer conduit 130 via an outflow wire, which is configured to transport the electrons to neutralizer 140.

Bottom conductive layer 410 may be positioned adjacent to porous conductive substrate 405. Bottom conductive layer 410, in conjunction with porous conductive substrate 405 may be configured to operate as a gas feedthrough and high amperage conductor.

In embodiments, growth substrate 415 may be bonded to bottom conductive layer 410, and be configured to provide a surface where nanotubes 450 can grow and be positioned on. Together, the porous conductive substrate 405, bottom conducting layer 410, and growth substrate 415 are held at a voltage such that, when multiplied by the field enhancement factor from the nanotubes 450, the voltage is sufficient to ionize a proportion of the gas molecules passing through the gap between the nanotubes 450 and the gate electrode 420. In embodiments, growth substrate 415 may be a nickel catalyst layer, or a catalyst dot. In other embodiments, where the pore size of the porous conductive substrate 405 is less than half the pore size of pores 440, the bottom conductive layer 410 may be omitted, and growth substrate 415 may be bonded directly to porous conductive substrate 405.

Insulative layer 430 may be positioned between bottom conductive layer 410 and gate electrode 420, and be formed of an insulative material. For example, insulative layer 430 may be formed of silicon dioxide. In embodiments, insulative layer 430 may be etched with pores 440.

Pores 440 may be gaps within insulative layer 430 that are configured to allow fuel gas flow through bottom conductive layer 410 towards gate electrode 420. The gas flowing through pores 440 may enter an ionizing area between the tips of nanotubes 450 and the gate electrode 420, and the resulting ions may then be expelled from the pores into the high field area produced by the electrode 120. In embodiments, gas temperature and pressure of the fuel supplied by fuel tube 210 may be selected so that the mean free path of an electron inside the pores 440 is insufficient for it to develop velocity that can cause spalling or other degradation of the nanotube 450 or other parts of the ionizer 125 before it is absorbed into the nanotubes 450.

Gate electrode 420 may be positioned adjacent to insulative layer 430, and be connected to ground or a small negative potential. Gate electrode 420 may be configured to operate as a gas feedthrough and high amperage conductor. In embodiments, Top layer 420 may be formed of various materials such as metal or a p-type semiconductor and coupled to ground, such as gold interface plating that is bonded to insulative layer 430.

Nanotubes 450 may be positioned within pores 440, and extending from substrate 415 towards a distalmost end near gate electrode 420. In embodiments, to form nanotubes 450 nickel catalyst dots are deposited on the bottom layer 410 at the bottoms of the pores 440, from which carbon nanotubes 415 are grown in vertical alignment through the pores 440. Specifically, nanotubes 450 may be grown on a central axis of pores 440. Furthermore, a distal end of nanotubes 450 may not extend into top layer 430.

In embodiments, a positive voltage is applied to bottom conductive layer 410, chosen to be sufficient to ionize the fuel gas. While the ionized fuel gas is passing through pores 440, nanotubes 450 may multiply the voltage at their tips, which, along with the very narrow gap between nanotube tips and the grounded gate electrode 420 results in extremely high fields in that gap. The field serves to polarize, and then ionize the fuel gas molecules that pass through the pores 440, using a soft ionization process. The resulting ions are pushed by gas pressure into the high field from electrode 120, which accelerates them by electric repulsion, producing thrust. The electrons stripped from the fuel gas are collected directly by the nanotube 450 tips, and conducted out the neutralizer conduit 130 to the neutralizer 140, which later emits them to neutralize the ions.

In embodiments, ionizer 125 may be round, and its diameter determines the total number of pores 440, and therefore the total gas flow rate. The larger the accelerating voltage, the larger ionizer 125 that may be used. Ultimately, the diameter of ionizer 125 may be based on the mass flow rate of the gas which will yield the correct operating pressure within the pores 440 given the gas temperature and the resulting rate of diffusion into a vacuum. In embodiments, the diameter of ionizer 125 may vary based on the available power supply; for example, if a large power supply is available, the diameter of ionizer 125 may have a diameter of five centimeters, while a small power supply may need a diameter of only three millimeters.

Figure 5:
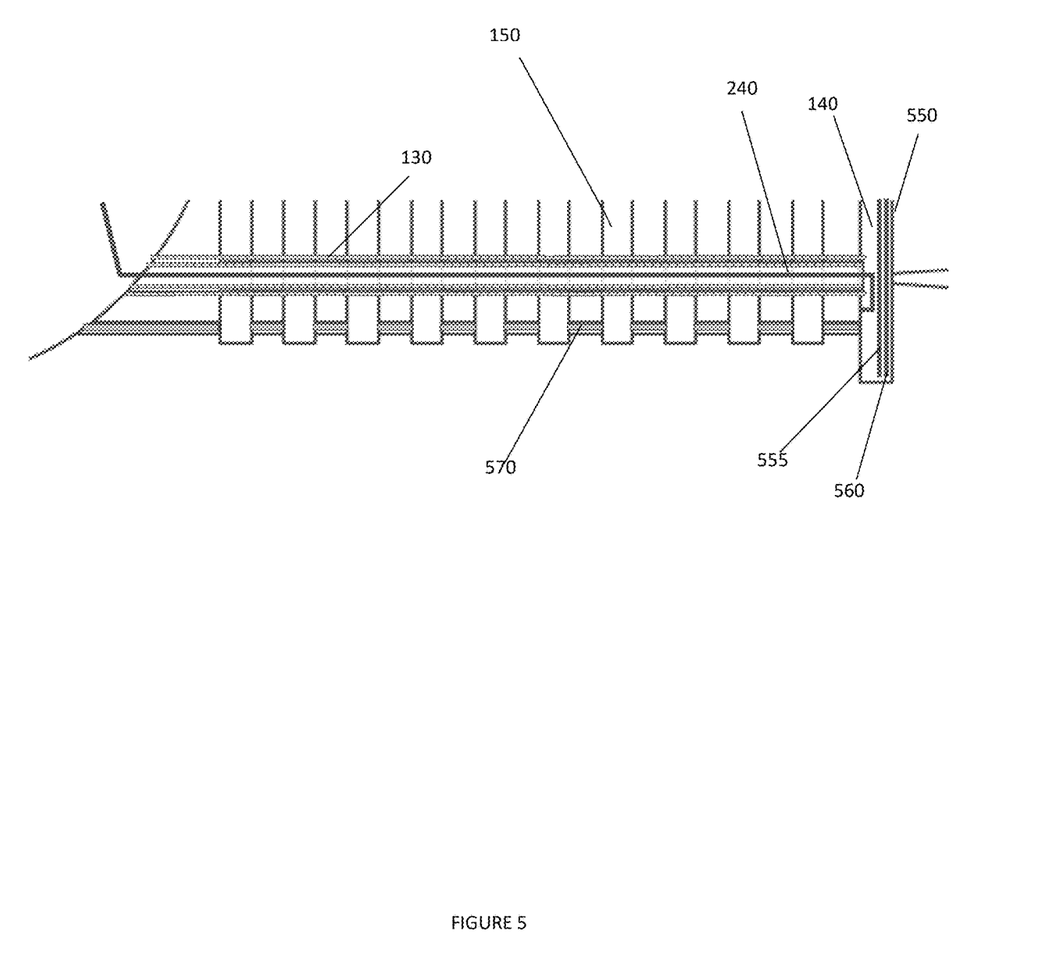
FIG. 5 depicts an embodiment of equipotential rings.

FIG. 5 depicts an embodiment of equipotential rings. Elements depicted in FIG. 5 may be described above, and for the sake of brevity a further description of these elements may be omitted. Furthermore, specific embodiments may not include a neutralizers or equipotential rings.

Neutralizer 140 may be positioned at the end of neutralizer conduit 130, and be configured to allow electrons stripped from the fuel gas and pulled from electrode 120 to be reintroduced to the ion stream. This may create a net neutral charge in the space behind the ion thruster 100. In other embodiments, neutralizer 140 may be replaced with an ionizer with the biases reversed, and no gas flow, which may emit an electron current from its nanotube tips by field effect electron emission.

Neutralizer 140 may include a ring 550, emitter 560, and static plate 555.

In some embodiments, ring 550 may be maintained at a negative potential with respect to ground, wherein emitter 560 is positioned aft of ring 550. Ring 550 may be charged to a sufficient voltage that in combination with the space charge from the exhaust ion plume, the field effect is sufficient to drive the required electron current to neutralize the plume. In further embodiments, ring 550 may be formed or carbon fiber felt brazed to a copper conductive ring, shielded from electrode 120 via plate 555, and connected to bottom layer 410 of ionizer 125 via neutralizer conduit 130. The copper ring may be held at a negative potential selected to achieve the appropriate amperage of neutralizing electron emissions from the carbon nanofiber felt. The felt may be heated with tungsten wire elements to lower its effective work function if desired. Other embodiments may utilize a thermionic cathode or a spindt tip array.

Emitter 560 may be configured to produce electrons that are then accelerated by the ring 550 away from vehicle 102 and electrode 120. The voltage of ring 550 may be selected such that the emitted electrons are equal to the number of those stripped from the fuel gas by ionizer 125, and those pulled from electrode 120 from charging circuit 310. Other embodiments may not utilize rings 550 when operated at low enough voltage that equipotential rings 150 are not required.

In embodiments, emitter 560 may be configured to use field emission to emit the electrons, and emitter 560 may be formed of carbon fiber felt brazed to the conductors that carry the electron current from neutralizer conduit 130. In embodiments, emitter may use thermionic emission, where a material is heated to a sufficient high temperature to drive the required electron current to neutralize the exhaust ion plume. Emitter 560 may be attached to the conductors that carry the electron current from neutralizer conduit 130, which supply the electrons to emit.

As further depicted in FIG. 5, equipotential rings 150 may be connected to electrode 120 via resistors 570 wired in series, wherein equipotential rings 150 may function as a voltage divider. Each of the equipotential rings 150 may include a resistor that is wired to each end at the point where the ring is split. The resistors 570 may be chosen to operate at potential differences at least equal to the difference between any two adjacent equipotential rings 150, and manage at least the level of power dissipation necessary to avoid destruction from the current flowing through them from electrode 120. Each resistor 570 may be attached between two equipotential rings 150 at the points where the rings are bisected, such that if the clockwise-most side of the bisection is termed the "beginning" of each ring, and the counterclockwise-most side is termed the "end", then the end of each ring may be attached through the resistor 570 attached to the beginning of the next adjacent distal ring, so that a series circuit is formed through all the rings. The first ring, which is positioned most proximate to electrode 120, may be attached to electrode 120 through a resistor 570, which may facilitate a radially aligned equipotential configuration that makes accidental discharge less likely. The distalmost ring may be attached to a ground potential. This may allow each of the equipotential rings 150 to evenly divide the voltage between electrode 120 and ground. Specifically, this may allow each of the equipotential rings 150 to be charged to the same voltage to control the voltage drop from electrode 120 to neutralizer 140 to limit arcing.

Figure 6:
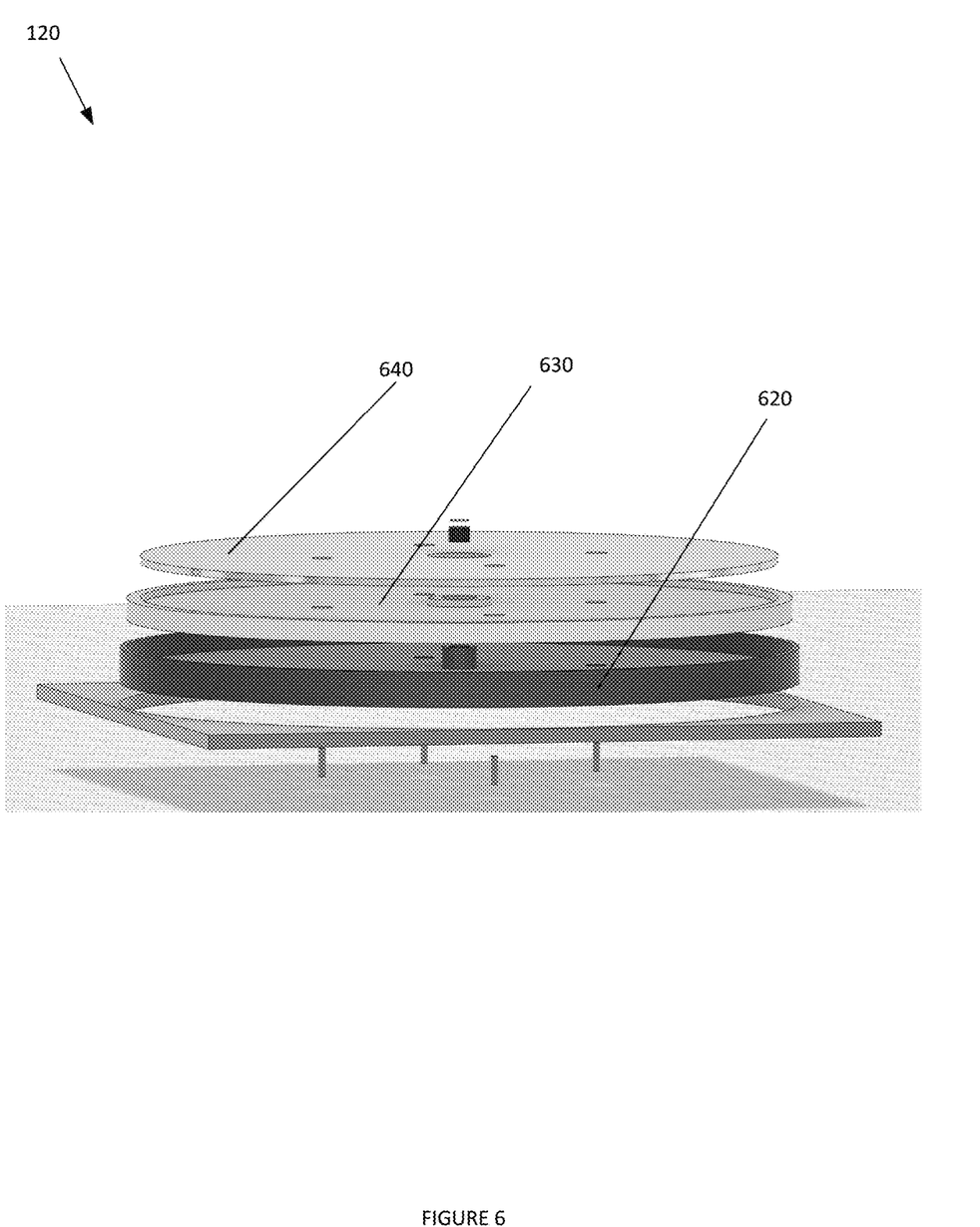
FIG. 6 depicts an electrode according to an embodiment, wherein the electrode is a flat disc.

FIG. 6 depicts electrode 120 according to an embodiment, wherein electrode 120 may be a flat disc. Elements associated with electrode 120 may be described above, and for the sake of brevity, a further description of these elements may be omitted.

Electrode 120 may be a conductive flat disc, a hemisphere, or another shape or format. Electrode 120 may be configured to accumulate an electric charge, creating very high electric potentials, which can produce high-voltage DC at low current levels. In embodiments, a larger sized electrode 120 may allow for more charge to accumulate on the shell of electrode 610, which allows for a higher throughput of gas, while a smaller electrode minimizes thruster requirements; power both approaches may be valuable depending on the specific application.

In embodiments electrode 120 may include dielectric 620, insulation 630, and electrostatic plate 640.

Dielectric 620 may be a device that polarizes in response to an electric field but is not itself conductive, so that the field may be attenuated by the dielectric. In embodiments, dielectric 620 may be a high relative permittivity dielectric to attenuate the field and protect a vehicle, such as a spacecraft.

Insulation 630 may be positioned between dielectric 620 and the electrostatic plate, and may be configured to prevent arc discharge from the electrostatic plate 640.

Electrode 120 may be configured to serve as a gate electrode for cathode beams and may be a positively charged high-voltage electrostatic plate. The voltage associated with electrode 120 may vary to adjust ISP (specific impulse), wherein the ISP is directly related to how efficiently the propulsion system produces thrust from the propellant mass leaving the spacecraft.

Figure 7:
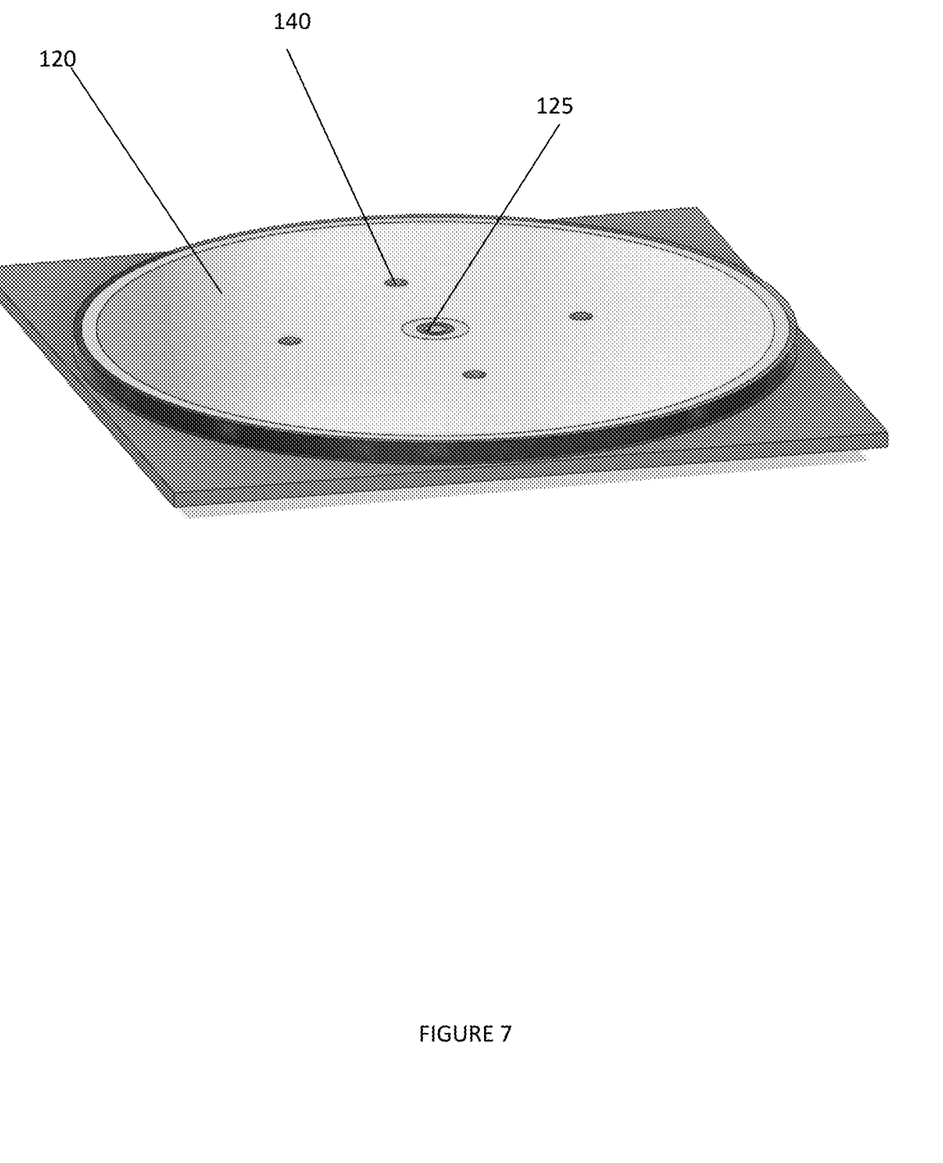
FIG. 7 depicts an electrode according to an embodiment, wherein the electrode is a flat disc.

FIG. 7 depicts electrode 120 according to an embodiment, wherein electrode 120 may be a flat disc. Elements associated with electrode 120 may be described above, and for the sake of brevity, a further description of these elements may be omitted.

As depicted in FIG. 7, electrode 120 may include an ionizer 125 and neutralizer 140.

The ionizer 125 may be configured to ionize ions, which are accelerated away from electrode 120 via repulsion. The ions made in a membrane may be repelled into space without bombarding thruster parts.

Neutralizer 140 may be configured to emit neutralizing electron beams to neutralize exhaust by space charge. In embodiments, the distance and angularity of the cathodes relative to ionizer 125 may determine the focal distance of the ion beams to change the neutralization distance of the emitted ions. In embodiments, the closer and tighter the angle of the neutralizer 140 may create a shorter neutralization distance, and the further away and wider angle neutralizer 140 are to ionizer 125 may increase the neutralization distance.

Figure 8:
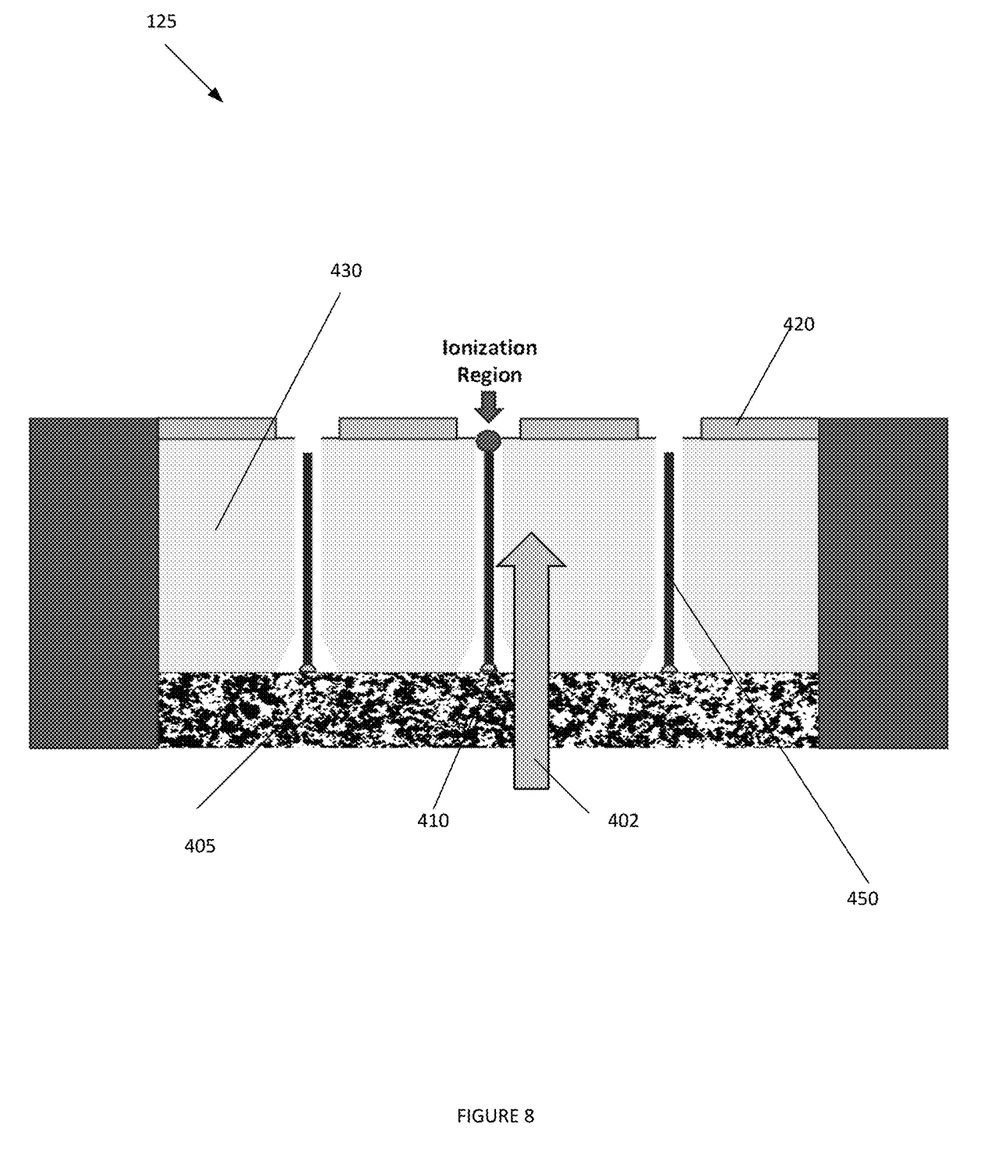
FIG. 8 depicts a detailed view of an ionizer, according to an embodiment.

FIG. 8 depicts a detailed view of ionizer 125, according to an embodiment. Elements depicted in FIG. 8 may be described above, and for the sake of brevity, a further description of these elements may be omitted.

As depicted in FIG. 8 ionizer 125 may include a porous conductive substrate 405, growth substrate 410, gate electrodes 420, insulative layer 430, and nanotubes 450.

In embodiments, the conductive substrate 405 may be a porous conductor configured to conduct fuel gas 402 to the tips of nanotubes 450. Electrons may quantum tunnel into nanotubes 450 without bombarding thruster parts. At the tips of nanotubes, may be an ionization region, wherein nanotube field enhancement may ionize the fuel at the tips of the nanotubes 450. The grounded gate electrodes 420 may accelerate ions into space to where repulsion dominates, creating thrust upon the vehicle.

In the foregoing specification, embodiments have been described concerning specific embodiments. However, one of the ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described concerning specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature, or function is not intended to limit the scope of the invention to such embodiment, feature or function).

Rather, the description is intended to describe illustrative embodiments, features, and functions to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein concerning particular embodiments thereof, a latitude of modification, various changes, and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," "in a specific embodiment" or similar terminology in various places throughout this specification do not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of the embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful by a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when the antecedent basis is "a" or "an") includes both singular and plural of such term (i.e., that the reference "a" or "an" clearly indicates only the singular or only the plural). Also, as used in the description herein, the meaning of "in" includes "in" and "on" unless the context dictates otherwise.

Benefits, other advantages, and solutions to problems have been described above about specific embodiments. However, the benefits, advantages, to solutions problems, and any component (s) that may cause any benefit, advantage, or solution to occur or become more pronounced are not to be construed as a critical, required, or essential feature or component.

The invention claimed is:

1. A system for creating propulsion in a vacuum, the system comprising:
   an ionizer chip with a plurality of open pore channels extending through a thickness of the ionizer chip, a proximal end of each of the open pore channels being configured to receive a fuel gas in gas phase;
   a plurality of high aspect ratio electrically conductive tips to which a positive electrical bias is applied in operation, configured such that a single electrically conductive tip extends axially within a corresponding open pore channel, whereby each electrically conductive tip is configured to generate positive ions by field effect ionization from the fuel gas that passes through the corresponding open pore channel;

a grounded or negatively biased gate electrode on a distal surface of the ionizer chip;

a plurality of ionization regions, each of the ionization regions being positioned between the distal end of the corresponding open pore channel and a respective electrically conductive tip, wherein the fuel gas is constrained by the open pore channels to flow within a respective ionization region as the fuel gas flows from the proximal end of the corresponding pore channel towards the distal end of the corresponding open pore channel around the respective tip such that the positive ions are created from the fuel gas and accelerated through the grounded or negatively biased gate electrode by the same electric field that produces the positive ions.

2. The system of claim 1, wherein the positive ions are accelerated by electric repulsion creating thrust upon an object.

3. The system of claim 1, whereupon the fuel gas is ionized by pulling electrons from the fuel gas molecules to create the positive ions by field effect ionization.

4. The system of claim 1 further comprising:

a cathode configured to emit neutralizing electron beams to neutralize the positive ions.

5. The system of claim 4, wherein the cathode format, angle, and position may be varied to change a focal distance of the electron beams and thus to change an ion neutralization distance from an electrostatic plate or other electrode surface.

6. The system of claim 1, further comprising:

insulative layers, wherein the gate electrodes are positioned on the insulative layers.

7. The system of claim 6, wherein a height of the insulative layers is longer than a height of the high aspect ratio conductors.

* * * * *